(12) United States Patent
Lal et al.

(10) Patent No.: US 11,205,197 B2
(45) Date of Patent: Dec. 21, 2021

(54) SYSTEM AND METHOD FOR DIMINISHING LATENCY IN REWARD PAYMENTS

(71) Applicant: Capital Intellect, Inc., Boston, MA (US)

(72) Inventors: Ranjan Lal, Wellesley, MA (US); Brian D. Boodman, Somerville, MA (US); Eric Patacchiola, Quincy, MA (US)

(73) Assignee: Capital Intellect, Inc., Boston, MA (US)

( * ) Notice: Subject to any disclaimer, the term of this patent is extended or adjusted under 35 U.S.C. 154(b) by 6 days.

(21) Appl. No.: 16/656,485

(22) Filed: Oct. 17, 2019

(65) Prior Publication Data

US 2020/0151774 A1  May 14, 2020

Related U.S. Application Data

(60) Provisional application No. 62/758,233, filed on Nov. 9, 2018.

(51) Int. Cl.
 *G06Q 30/02* (2012.01)
 *G06Q 20/02* (2012.01)

(52) U.S. Cl.
 CPC ....... *G06Q 30/0273* (2013.01); *G06Q 20/023* (2013.01); *G06Q 30/0277* (2013.01)

(58) Field of Classification Search
 CPC ............. G06Q 30/0273; G06Q 20/023; G06Q 30/0277; G06Q 20/387

USPC ...................................................... 705/14.69
See application file for complete search history.

(56) References Cited

U.S. PATENT DOCUMENTS

| 10,007,915 B2 | 6/2018 | Singh et al. |
| 2011/0004546 A1 | 1/2011 | Thomas |
| 2017/0053317 A1 | 2/2017 | Dione |
| 2017/0232300 A1 | 8/2017 | Tran et al. |
| 2018/0240143 A1 | 8/2018 | Salmon et al. |

FOREIGN PATENT DOCUMENTS

WO  WO-2014160236 A1 * 10/2014 ......... G06F 16/9535

OTHER PUBLICATIONS

Adriana da Matta, Delay discounting: concepts and measures, 2012 (Year: 2012).*
International Search Report from PCT/US2019/056825, dated Jan. 10, 2020.

* cited by examiner

*Primary Examiner* — Tarek Elchanti
(74) *Attorney, Agent, or Firm* — Morse, Barnes-Brown & Pendleton, P.C.; Sean D. Detweiler, Esq.

(57) ABSTRACT

A system and method for diminishing latency in processing reward payments to users using automated clearing house transactions linked to user accounts to direct and adjust user compensation, thereby removing dependency on advertiser refund period expiration and resultant sale value and commission locking for purchases made by users. The system and method enable truncated payment cycles without increasing publisher liability associated with advertiser commission modification.

22 Claims, 6 Drawing Sheets

SYSTEM AND METHOD FOR DIMINISHING LATENCY IN REWARD PAYMENTS

CROSS-REFERENCE TO RELATED APPLICATION(S)

This application claims priority to, and the benefit of, U.S. Provisional Application 62/758,233, filed Nov. 9, 2018, for all subject matter common to both applications. The disclosure of said provisional application is hereby incorporated by reference in its entirety.

FIELD OF THE INVENTION

The present invention relates to a technology for diminishing latency in processing reward payments to users using automated clearing house transactions linked to user accounts to direct and adjust user compensation. The technology removes dependency on advertiser refund period expiration, resultant sale value locking, and commission locking for purchases made by users. More specifically, the system and method of the technology enable publisher payments to users in anticipation of rewards to be paid by advertisers or other economic entities.

BACKGROUND

Publishers, such as cashback rewards websites, conventionally do not pay cash back to users until they have been paid by the advertiser (also called retailer), though more sophisticated publishers may choose to pay out sooner, exposing them to the risk that the advertiser will reverse the transaction. However, publishers generally do not pay out before the refund period expires, as users may (intentionally or unintentionally) return items during the refund period but after receiving the cashback or other reward, causing the user to receive a cashback reward even though the publisher commission was reversed. As a result, even users who do not intend to perform a refund end up waiting on payment until the refund period has expired.

However, this technology and methodology, etc., of conventional cashback reward systems experiences some shortcomings. Cashback rewards websites, also called publishers, do not pay cash back to users until they have been paid by the advertiser, also called retailer, and in this way avoid assuming a liability resulting from making a payment to a user but not yet receiving a payment from an advertiser. Some more sophisticated publishers may choose to pay out sooner, assuming a risk that the retailer/advertiser will reverse the transaction and create a liability. Publishers, however, generally do not desire to pay out before the refund period expires, because users may return items (intentionally or unintentionally), causing the user to receive a cashback reward even though the publisher commission was reversed. In general, the longer the delay, the more likely a publisher is able to receive a full commission payment corresponding to a reward payment. As a result, even users who do not intend to perform a refund must often wait for payment until the refund period has expired. This is inconvenient for users and publishers. A publisher who chooses to ignore or factor into their business model the risk of user-initiated transaction reversals can pay users shortly after a sale reports to users, knowing that there will be some losses. This practice, however, introduces substantial liability on the publisher, since any user may initiate a refund after the publisher has already paid the user cash back. Currently, cashback websites or publishers either do not take this approach, or they significantly limit how far in advance of commission payment rewards payments will be paid to users, so as to minimize the exposure to losses stemming from refund requests after receiving rewards.

SUMMARY

There is a need for a technology for diminishing latency in processing reward payments to users using automated bidirectional transactions linked to user accounts to direct and adjust user compensation, thereby removing dependency on advertiser refund period expiration and resultant sale value and commission locking for purchases made by users. The present invention is directed toward further solutions to address this need, in addition to having other desirable characteristics. Specifically, instead of avoiding user-initiating transaction reversals by paying out more slowly, a cashback website is enabled by the technological advancement of the present invention to mitigate this risk by ensuring that the user has provided a means for any transaction reversal to be recovered as an alternative step replacing payment cycle steps that require delays or waiting periods. For example, a payment to a customer who accepts payment via an automated bidirectional transfer such as "Direct Deposit" (ACH: Automated Clearing House) can be reversed, as ACH supports both credits and debits. Alternatively, a customer who accepts payments via check could provide a credit card which a publisher could bill for any transactions which were reversed after they had been paid to the user. Note that recovery of such a reversal may optionally be avoided by the publisher if the reversal is covered by other existing, unpaid transactions.

In accordance with example embodiments of the present invention, a computer implemented method diminishes latency in processing reward payments to users by implementing nonconventional steps that represent a technological improvement over currently known and practiced architectures and processes for managing reward payments. The computer implemented method receives, using a processor of a publisher system and an electronic network, processing data from one or more computer devices of the at least one advertiser corresponding to an initiative of the at least one advertiser comprising commission data, and stores, using a storage device and the processor of the publisher system, the processing data. The method also receives, from a user device before, simultaneously with, or after receipt of processing data, a notification or activity identifier data of a purchase made with the at least one advertiser corresponding to the initiative and a request for payment of a reward payment for the purchase. The method then confirms, using the processor of the publisher system, that the user device and a user account held with a third-party financial entity correspond to a registered user. The method also confirms that the purchase corresponds to the advertiser initiative and the processing data. Upon confirmation, the method, using the processor and other components and functionalities of the publisher system, pays the reward payment by one or more automated bidirectional transfers (e.g. by automated clearing house (ACH) transfer) to the one or more user accounts according to the processing data and prior to at least one of the group consisting of locking a commission of the at least one advertiser, expiration of a refund period, payment of a commission by the at least one advertiser to the publisher system, payment of a commission by the at least one advertiser to an affiliate network, and combinations thereof. Conventional systems and methods are required to wait until expiration and locking of a sale and commission by the advertiser is completed before engaging in payment to the user. The method, on the contrary, makes the payment to the user and then receives, from the at least one advertiser, one or more locked commissions of the at least one advertiser. The method enables aggregation of data from multiple purchases earning different rewards amounts from multiple sets of processing data and consolidation into a reward payment made to the user, thereby reducing the number of payments made to the one or more user accounts while managing the processing data, registered user profile data and system intelligence data. The method then reconciles, using an adjustment device, any differences between the one or more locked commissions, the commission data and the reward payment, and correspondingly adjusts the one or more user accounts by an additional one or more adjustment automated bidirectional transfers (e.g. ACH transfer) when one or more locked commissions of the at least one advertiser and the reward payment are not equivalent, and then updates the processing data, registered user profile data and system intelligence data for future processing activities.

In accordance with aspects of the present invention, the computer implemented method operates with registered users that may comprise a user that has consented and registered by providing financial data designated for the publisher system to make automated bidirectional transfers (e.g. ACH transfers) and adjustment automated bidirectional transfers (e.g. ACH transfers) comprising debit and credit transfers to and from the one or more user accounts held with a third party financial entity, the registered user profile data, and device data corresponding to the user device. The activity identifier data can comprise link data or receipt data corresponding to a purchase made by such a registered user. The one or more automated bidirectional transfers can comprise one or more automated clearing house (ACH) transfers. The one or more adjustment automated bidirectional transfers can comprise one or more adjustment automated clearing house (ACH) transfers.

In accordance with aspects of the present invention, the method can adjust the one or more user accounts by adjusting the one or more user accounts by one or more adjustment automated bidirectional transfers comprises reversing funds paid to the one or more user accounts using an additional ACH transfer back to an account of the publisher system in an amount comprising the differences between the one or more locked commissions and the reward payment for the purchase already paid to the one or more user accounts. The reversing of funds paid to the one or more user accounts using an additional ACH transfer can comprise reversing all of the funds paid to the one or more user accounts or reversing only part of the funds paid to the one or more user accounts. Adjusting the one or more user accounts by one or more adjustment automated bidirectional transfers (e.g. an ACH transfer) can further comprise altering an amount comprising the differences between the one or more locked commissions and the reward payment for the purchase already paid to the one or more user accounts by an amount of pending unpaid reward payments for other purchases made by the user. More particularly, the method can adjust the one or more user accounts by one or more adjustment automated bidirectional transfers (e.g. an ACH transfer or coordinated credit card transfer) after decreasing an amount for reversing funds paid to the user corresponding to the amount of pending unpaid reward payments for other purchases made by the user and subsequently adjusting the other pending reward payments to account for satisfaction of a reversal balance. The differences between the one or more locked commissions, the commission data, and the reward payment can comprise one or more of the group consisting of: failure, by the user, to pick up the purchase wherein the purchase was designated for in-store pick-up; the purchase being ineligible for reward payment; a payment method of the user being declined; the user initiates transaction reversal; the user performs credit card charge-back on the purchase; the user cancels the purchase; the user modifies the purchase or an order related thereto; the purchase being refunded; the user makes the purchase fraudulently; the user makes the purchase using a stolen credit card; and any combinations thereof.

In accordance with aspects of the present invention, the purchase can be facilitated by the user activating a publisher link adding special tracking parameters to track user transaction activities and the processing data used to perform account management. Payment and reconciliation can comprise one or more transaction records of the advertiser. The processing data can further comprise one or more additional transaction records of the advertiser comprising a report from the advertiser of the purchase that can comprise the special tracking parameters. Moreover, the processing data can also comprise one or more additional reports from the advertiser of the purchase comprising at least one of the group consisting of: an indication of changes to a value of the purchase, an indication of changes to the commission data; an indication of changes to a value of a commission, an indication that a commission is a locked commission so that values will not be modified, an indication of payment of the locked commission, and any combinations thereof.

In accordance with aspects of the present invention, the method can transmit and receive, from one or more computer devices of the at least one advertiser, data and information through a designated affiliate network, comprising at least one affiliate network acting as an intermediary transferring data between the at least one advertiser and the publisher system. When using the affiliate network embodiment, a purchase can be facilitated by the user activating a publisher link, appearing in a publisher website or appearing in third party content, and the publisher system can then redirect the user to an affiliate network, adding special tracking parameters to track user transaction activities.

In accordance with aspects of the present invention, the method and the publisher system can comprise a publisher website configured to enable the user to request reward redemption, follow links to advertiser content, register for services provided by the publisher system, and provide user account data associated with the one or more user accounts wherein the user agrees to terms for ACH debit and credit transfers using the one or more user accounts. The one or more user accounts data can further comprise one or more of the group consisting of a user account number, a user account routing number, a user account type, a user account location, a user account financial entity, user account rules, user account restrictions, a user account unique identifier, user account access information, and combinations thereof.

In accordance with aspects of the present invention, the method and the publisher system can be configured to enable the user to request reward redemption, follow links to advertiser content, register for services provided by the publisher system, and provide user account data associated with the one or more user accounts wherein the user agrees to terms for the one or more automated bidirectional transfers using the one or more user accounts. The one or more user accounts can further comprise a first user account comprising a user credit card account or a user bank account providing for ACH debit and credit transfers, and a second user account comprising a user credit card account or a user bank account providing for ACH debit and credit transfers, used for adjusting the one or more user accounts when the one or more locked commissions of the at least one advertiser and the reward payment are not equivalent, then updating the processing data, registered user profile data and system intelligence data.

In accordance with aspects of the present invention, the method and the publisher system can be configured to enable the user to provide user account data associated with the one or more user accounts used to receive reward payments that selects a delivery device comprising one or more of the group consisting of gift cards, reward cards, checks, prizes, digital or cryptographic currency, and customized publisher currency. Paying, using the processor, the reward payment by one or more automated bidirectional transfers to the one or more user accounts can comprise initiating an alternative payment delivery to the user using the delivery device.

In accordance with example embodiments of the present invention a system for diminishing latency in processing reward payments to users comprises at least one processor, memory, at least one storage device, and at least one advertiser device of at least one advertiser configured to analyze and transmit processing data corresponding to an initiative of the at least one advertiser comprising commission data. The system further comprises a user device configured to provide to the processor a notification or activity identifier data of a purchase made with the at least one advertiser corresponding to the initiative and a request for payment of a reward payment for the purchase. The system also comprises a publisher website and an electronic communications network configured for communication among the system, the at least one advertiser device, and the user device. The processor of the system is configured to: receive and store, using the at least one storage device, the processing data transmitted by the at least one advertiser device; confirm that the user device and a user account held with a third party financial entity correspond to a registered user, and that the purchase corresponds to the advertiser initiative and the processing data; and receive, from the at least one advertiser, one or more locked commissions of the at least one advertiser. The system also comprises a payment processor, configured to pay a reward payment made by one or more automated bidirectional transfers/transactions (e.g. an ACH transfer/transaction) to a user account paying, using the processor, the reward payment by automated clearing house (ACH) transfer to the one or more user accounts according to the processing data and prior to at least one of the group consisting of locking a commission of the at least one advertiser, expiration of a refund period, payment of a commission by the at least one advertiser to the publisher system, payment of a commission by the at least one advertiser to an affiliate network, and combinations thereof. The system additionally comprises an adjustment device configured to reconcile differences between the one or more locked commissions, the commission data and the reward payment, and adjust the one or more user accounts by or more adjustment automated bidirectional transfers (e.g. an ACH transfer) when one or more locked commissions of the at least one advertiser and the reward payment are not equivalent. The system comprises an update device, configured to update the processing data, registered user profile data, and system intelligence data for future processing activities.

In accordance with aspects of the present invention, the system registered user can comprise a user that has consented and registered by providing financial data designated for the system to make automated bidirectional transfers and adjustment automated bidirectional transfers comprising ACH transfers comprising debit and credit transfers to and from the one or more user accounts held with a third party financial entity, the registered user profile data, and device data corresponding to the user device. The activity identifier data can comprise link data or receipt data corresponding to a purchase made by such a registered user. The one or more automated bidirectional transfers can comprise one or more automated clearing house (ACH) transfers. The one or more adjustment automated bidirectional transfers can comprise one or more adjustment automated clearing house (ACH) transfers.

In accordance with aspects of the present invention, the system can adjust the one or more user accounts by one or more adjustment automated bidirectional transfers (e.g. ACH transfer) that comprise reversing all of the funds paid to the one or more user accounts or reversing only part of the funds paid to the one or more user accounts using an additional ACH transfer back to an account of the publisher system in an amount comprising the differences between the one or more locked commissions and the reward payment for the purchase already paid to the one or more user accounts, and wherein adjusting the one or more user accounts by one or more adjustment automated bidirectional transfers (e.g. ACH transfer) further comprises altering an amount comprising the differences between the one or more locked commissions and the reward payment for the purchase already paid to the one or more user accounts by an amount of pending unpaid reward payments for other purchases made by the user and subsequently adjusting the other pending reward payments to account for satisfaction of a reversal balance.

In accordance with aspects of the present invention, the purchase can be facilitated by the user activating a publisher link and the system redirecting the user to an affiliate network adding special tracking parameters to track user transaction activities. The processing data further comprises one or more additional transaction records of the advertiser comprising a report from the advertiser of the purchase comprising the special tracking parameters.

In accordance with aspects of the present invention, the system intelligence data can limit maximum liability by implementing transaction safeguards selected from one or more of the group consisting of: limiting a total reward value per user, per month, per advertiser, and per account; disallowing advance reward payments for users sharing a user account; disallowing advance reward payments corresponding to any advertiser with frequent reversals or differences in locked commissions; disallowing advance reward payments corresponding to any advertiser with extended locking periods; delaying reward payments until after an automated transaction reversal period has passed for advertisers with frequent automated transaction reversals; enabling additional industry standard fraud detection rules and logic; altering treatment of recovery liability and system intelligence data if a transaction unexpectedly remains unlocked for an extended period of time; and combinations thereof.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
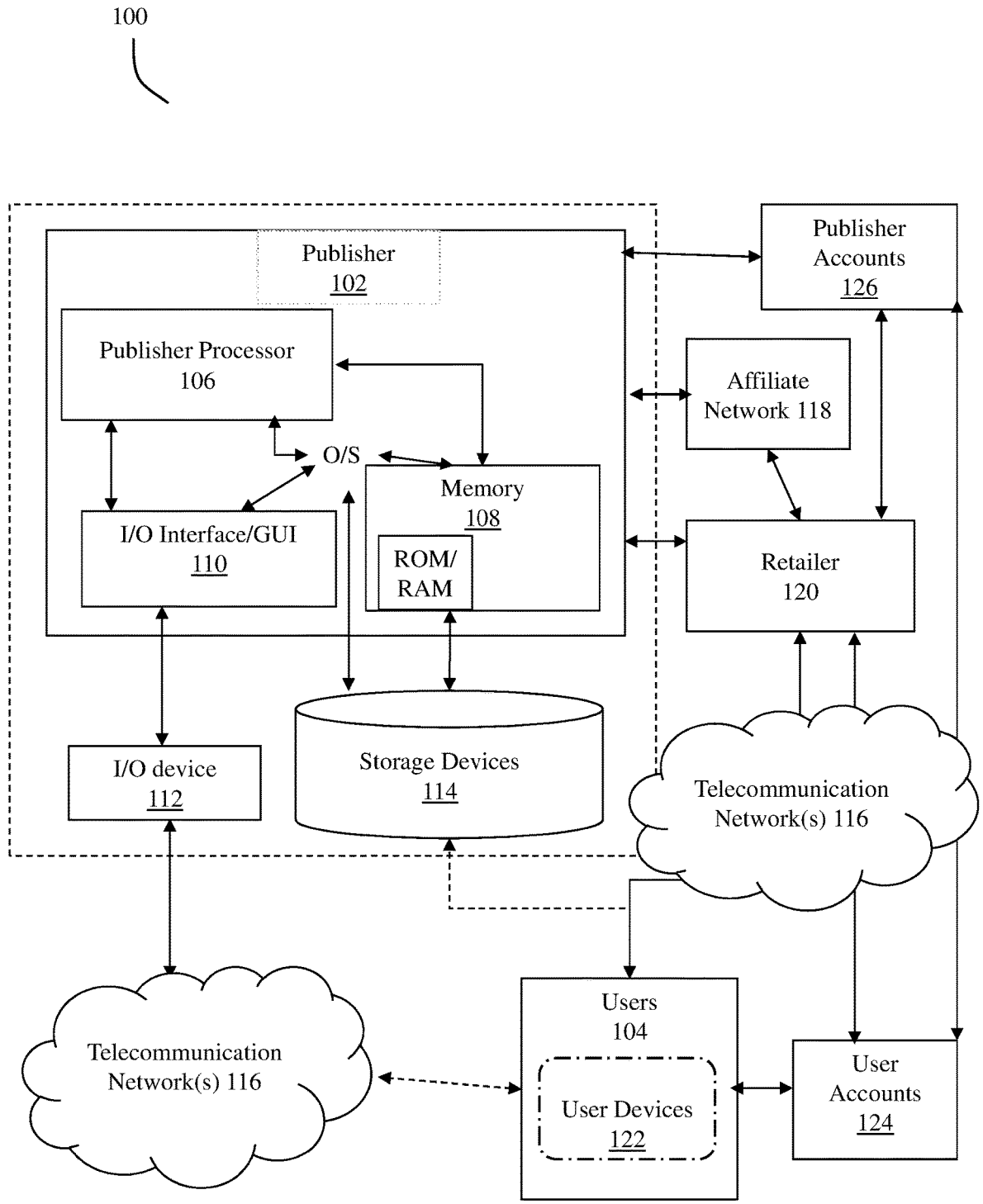
FIG. 1 is a diagrammatic overview of the publisher system for diminishing latency in processing reward payments to users using automated clearing house transactions.

An illustrative embodiment of the present invention relates to a technological advancement and practical application in the form of a system and method for reducing or diminishing latency in processing reward payments to users. The system and method introduce unconventional processes into the reward payment cycle enabled by technological systemic improvements to enable automated transaction reversal to circumvent reliance on advertiser payment prior to performing reward payments to users for transactions they have participated in with an advertiser. The system and method provide specific improvements in conventional payment architecture through the use of automated clearing house transactions linked to user accounts that are pre-approved for service activity to direct and adjust user compensation, thereby removing dependency on advertiser refund period expiration and commission locking for purchases made by users as a prerequisite for user reward payment. Several events that impact an advertiser's sale value and commission accounting may generally occur very shortly after the sale related to a user purchase is reported, including user-initiated transaction reversals. Instead of avoiding user-initiating transaction reversals by paying out only after receiving payment from the advertiser, which requires refund period expiration and commission locking, the system and method allow for payment as soon as a sale report or purchase transaction notification or activity identifier data are received. The system and method enable the cashback website or publisher to mitigate or avoid the risk of creating a liability related to making a payment out before receiving a payment in by ensuring that the user has provided a means for any transaction reversal to be recovered by a corresponding payment reversal using an additional Automated Clearing House (ACH) transfer. The system and method additionally provide for tracking user activity in a more comprehensive manner than was previously available, tracking user activity from initial exposure to advertising, to linking to publisher content, to affiliate network activity, to linking and interaction with advertiser resources, to conversion activity, to purchase transaction activity, and also to post-purchase activity including account activity, reversal activity, and additional subsequent propensity and behavior data.

In a conventional reward payment cycle, a publisher acts to assist in advertising the product of an advertiser to a group of consumers or users, who in turn are exposed to content from the publisher, which under ideal conditions leads to interaction with the advertiser resulting in a purchase by the user of products sold by the advertiser. The user may be further incentivized to engage in a purchase transaction by being offered a discount or reward for completing a particular type of purchase at a particular advertiser. Other entities may also offer discounts or rewards to consumers or users. When a sale results from activity undertaken by the publisher on behalf of the advertiser, the advertiser compensates the publisher with a commission. The commission may be subject to various rules set by the parties including payment of specific commission amounts for specific types of sales that may be subject to reversal or modification according to agreed upon rules and terms, as well as rules that may indicate how activities of the user are counted for commission purposes. The commission payment may be based on a number or percentage of traceable sales, other conversion events such as cost per conversion metrics, or other metrics including cost per click, cost per impression, or payment defined by time periods under which advertising is performed on behalf of the advertiser. The transactions involved may be directly between parties, or facilitated by intermediaries, and may be completed in person or using electronic means, such as the internet, as a conduit for the transaction.

A publisher is defined according to industry standards as an entity or company that displays advertisements, most often in return for compensation in the form of a commission. A publisher may operate a website to interact with consumers, users, advertisers, retailers, and other entities, and may also be referred to as a reward website or a cashback website. Additionally, a publisher may offer enrollment in services and programs to consumers or users who then become members and receive offers or services in exchange for participation that may include exchange of data or information related to the member or their behavior. A publisher who offers rewards to such users may also be referred to as a reward website or a cashback website.

An advertiser is defined according to industry standards as an entity or company that pays publishers to display advertisements and engages in commercial transactions with customers, consumers, or other users. An advertiser may also be referred to as a retailer and may participate in an initiative or program to pay commissions related to an advertising campaign or other strategic initiative or marketing strategy. These commissions may be paid to publishers according to rules and terms set by those parties.

A user is defined as any individual person or entity that participates in a financial transaction (in most cases a purchase transaction) or other economic activity with an advertiser, and may, prior to or after such a financial transaction, engage in transactions or otherwise participate in programs or receive services related to a publisher, including receiving reward payments for financial transactions with an advertiser that were facilitated by the user's interaction with advertising information supplied or presented by that publisher.

A financial entity may be a bank, credit union, financial institution, credit card company or other financial services provider, or any entity that provides, owns, manages, or services accounts belonging to or assigned to a customer, user, member, advertiser, retailer, publisher, affiliate network, or other payment cycle entity, which store currency or assets for financial transactions, including cryptographic currency, or otherwise facilitate transactions using known banking channels. Financial entities are by definition separate entities from advertisers and publishers.

An affiliate network is a network or group of entities participating together and acting as an intermediary transferring data between publishers and advertisers. Affiliate networks may enable easier transfer or exchange of leads, customers, promotions, programs or other resources between participating member entities. Affiliate networks may aggregate data and allow members access to greater sets of resources than would otherwise be available, often in exchange for fees or sharing of revenue from related activities agreed upon by member entities.

A commission is an agreed upon amount or value to be paid for services including rendered to a party, including advertising services rendered by a publisher to an advertiser. An unlocked Commission is a commission that is not finalized and may be modified or reversed by the retailer or advertiser. A locked commission is a commission that a retailer or advertiser has locked. Locked commissions cannot be modified. An advertiser may report locking information to a publisher. Advertisers may also set locking directly, report, "all sales older than X days are locked", or report, "this sale can be treated as locked on day X." A reversal is a commission that an advertiser initially intended to pay, but chose not to pay, or modified, choosing to not fully pay (e.g., because the commissioned transaction was refunded).

A liability is defined as the difference between the amount of money paid out to a given user for one or more transactions and the total amount of locked commissions related to the one or more transactions of that user as governed by agreements establishing the commission. Note this definition of liability may treat all locked commissions as having been paid, even though it is possible for a retailer or advertiser to fail to pay such a commission (e.g., because the retailer or advertiser declared bankruptcy). Such a risk factor is beyond the scope of the payment cycle addressed by this invention; it is already accepted practice in the industry to pay user commissions in advance of being paid by the advertiser. This definition does not treat "owing" incentives to a user as a form of liability. In commission relationships and agreements an advertiser may interact directly with a publisher, or some advertisers use an affiliate network as an intermediary.

An accelerated payment is a payment that is made by a publisher to a consumer, user, or member prior to receipt of a commission from a retailer, advertiser, or affiliate network. Accelerated payments may also be referred to as minimal delay payments, lightning payments, or quick payments.

FIGS. 1 and 3 through 6, wherein like parts are designated by like reference numerals throughout, illustrate an example embodiment or embodiments of a system and method for diminishing latency in processing reward payments to users using automated clearing house transactions linked to user accounts to direct and adjust user compensation, thereby removing dependency on advertiser refund period expiration and resultant sale value and commission locking for purchases made by users, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 represents a diagrammatic overview of the publisher system 100 for diminishing latency in processing reward payments to users 104 using automated clearing house transactions. A publisher 102 may operate the system 100 in support of a cashback website. The publisher system 100 comprises a processor 106 and memory 108 operated in conjunction with an operating system. The system 100 also comprises one or more storage devices 114 that may be of various types including databases or block chains stored internally or externally to the publisher 102, input/output interfaces 110, and other input output devices 112 that may be used to interact with various entities and components including users 104, user devices 122, user accounts 124, retailers or advertisers 120, affiliate networks 118, internal or external publisher accounts 126 that may be held with financial entities, and other entities, wherein communication may be accomplished directly or electronically by telecommunications or other electronic communications networks 116. The system 100 enables a user 104 to click or activate with a user device 122 a publisher 102 link or other interactive conduit that may be presented on the publisher website 102 operated by the system 100 or elsewhere including other sites on the internet 116. The system 100 enables a user 104 to communicate with an advertiser 120 and make one or more purchases for which that user 104 is able to request payment from the publisher 102 once the advertiser 120 or user 104 provide data verifying the sale purchase. Most often the publisher 102 redirects the user 104 to an affiliate network 118 (or to advertiser 120 content or resources), adding special tracking parameters to monitor and verify activity. The affiliate network 118 then further facilitates communication with the advertiser 120. The user 104 interacts with the advertiser 120 and makes a purchase. The advertiser 120 reports that purchase to publisher 102 using the system 100. This report typically includes the tracking parameters, the expected commission, and the sale value. Optionally, the advertiser 120 may send one or more additional purchase reports to indicate changes to the commission and sale value (e.g., due to transaction reversals). The system 100 enables the user 104 to submit requests for reward payment and other activity identifier data, including by user device 122, to the publisher 102. The system 100 enables both conventional payment cycle steps (where the advertiser 120 at some point then reports that sale is locked, and advertiser 120 subsequently pays publisher 102, then the publisher 102 pays the user 104 for locked sales and as a result payment is deposited in a user account 124), and more importantly, enables accelerated payment cycle steps using one or more automated bidirectional transfers that may comprise one or more automated clearing house (ACH) transfers or automated clearing house transactions between user accounts 124 and publisher accounts 126 that enable reversible reward payment to the user 104 by the publisher 102 prior to the time at which the advertiser 120 reports that sale is locked and subsequently pays publisher 102. The automated clearing house (ACH) is an electronic network for financial transactions, generally domestic payments. An ACH is a computer-based clearing and settlement facility established to process the exchange of electronic transactions between participating financial institutions. It is a form of clearing house that is specifically for payments and may support both direct credit transfers and direct debits. In some cases, automated clearing house transactions may also be referred to as direct deposits. In the event of a reversal, the one or more automated bidirectional transfers that may comprise automated clearing house transactions may be reversed by one or more adjustment automated bidirectional transfers that may comprise one or more adjustment automated clearing house (ACH) transfers, returning payment made to user accounts 124 back to publisher accounts 126.

The system 100 monitors, tracks, stores using the storage devices 114, and updates using the processor 106, memory 108 and storage devices 114, all of the activities of the respective members and components of the system 100, allowing for the processor 106 to be used by the system 100 to derive additional data and intelligence from the functioning of the system 100 over time.

Figure 2:
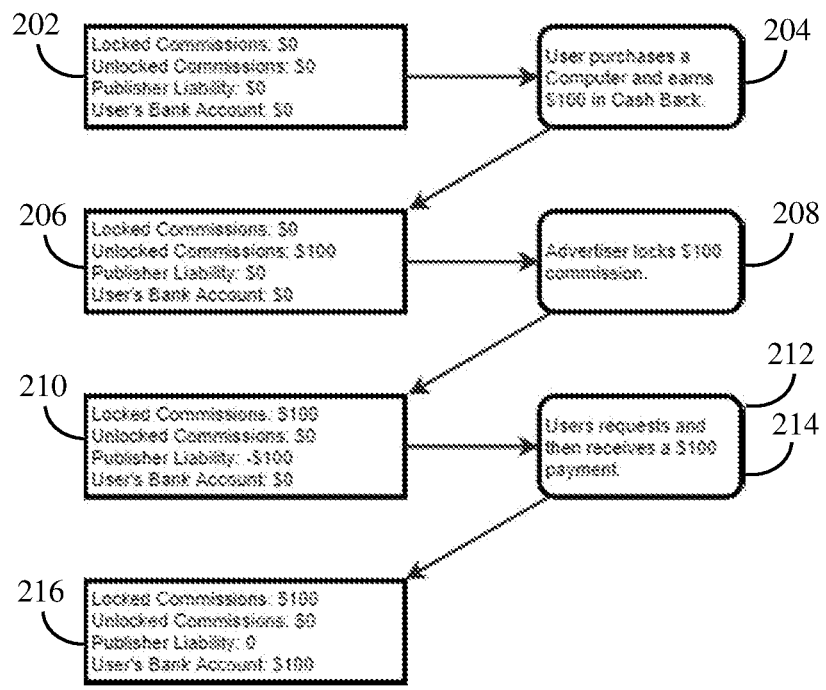
FIG. 2 is a diagrammatic flow chart illustrating an example conventional computer implemented method currently known that shows how a user experiences a standard payment flow.

FIG. 2 illustrates a diagrammatic flow chart of an example conventional computer implemented method that shows how a user 104 experiences a standard payment flow in a reward payment cycle. In the standard reward payment cycle a user 104 makes a purchase and is able to request payment from the publisher 102 only once the advertiser 120 locks the commission. Most often the process of the payment cycle starts at Step 202 when a user 104 clicks with a user device 122 a publisher 102 link that may be presented on the publisher 102 website operated by the system 100 or elsewhere including other sites on the internet 116. That publisher 102 redirects the user 104 to an affiliate network 118 (or to advertiser 120 content or resources), adding tracking parameters. The user 104 interacts with the advertiser 120 and makes a purchase (e.g. a computer) at Step 204, thereby earning a reward (e.g. cashback reward). The advertiser 120 reports that purchase to publisher 102 at Step 206, thereby establishing and verifying the existence of an unlocked commission to be paid to the publisher 102 in the future (e.g. system 100 records would indicate $0 in locked commissions; $100 now present in unlocked commissions; $0 in accrued publisher 102 liability; and $0 transferred to user's bank account 124). This report typically includes the tracking parameters from prior steps, the expected commission, and the sale value. Optionally, the advertiser 120 may send one or more additional purchase reports to indicate changes to the commission and sale value (e.g., due to transaction reversals). At Step 208, the advertiser 120 at some point then reports that sale is locked as a locked commission. A locked sale is a commitment by the advertiser 120 that the sale will not be modified, updated in the records stored in the system 100. The advertiser 120 subsequently pays publisher 102 by a transaction with the publisher account 126 for locked sales at Step 210 (e.g. system 100 records would indicate $100 in locked commissions; $0 in unlocked commissions; $-100 in publisher 102 liability for a known but unprocessed reward and a received $100 payment; and $0 transferred to user's bank account 124). Then, in response to a user 104 request, Step 212, the publisher 102 pays the user 104 (including from the publisher account 126) for locked sales at Step 214 and as a result payment is deposited in a user's bank account 124, and publisher 102 records and accounts 126 reflect both receipt of the advertiser 120 commission and payment to the user's bank account 124 at Step 216 (e.g. system 100 records would indicate $100 in locked commissions; $0 in unlocked commissions; $0 in publisher 102 liability due to payment to user 104; and $100 successfully transferred to user's bank account 124). In the payment cycle, typically payment is made through conventional banking channels, including payment by check, credit card, etc. Most often, advertisers 120 set periods of time that must elapse from the time of sale to the time of locking commission. This is because the payment cycle may be disrupted. Disruptions in the reward payment cycle often include user-initiated transaction reversals. To minimize the effect of such disruptions the advertiser 120 implements a refund period (refund window) during which users 104 may initiate reversals prior to locking commission. Only upon expiration of the refund period does the advertiser 120 lock commissions. This delay improves outcomes for advertisers 120, minimizing the probability of paying a commission for a sale that was ultimately not realized, however the delay is inefficient and inconvenient for both publishers 102 and users 104, and also frequently results in difficulties processing data and tracking or attributing activities related to purchase behavior. Because it is economically advantageous to shorten delay periods in the payment cycle, both advertisers 120 and publishers 102 have begun to rely on probabilistic calculations to determine payment timing, assuming some risk in return for the rewards associated with faster payment. For example, advertisers 120 set refund periods so that user-initiated transaction reversals rarely occur beyond a given advertiser's 120 refund window but may still subject them to some payment recovery issues. It is also common in the cashback industry to pay the user 104 slightly before payment by the advertiser 120, relying on historical data, to predict with high probability when a commission payment will be made, whether an advertiser 120 will send additional purchase reports relating to a sale, and what percentage of a commission is likely to be paid. As payment to the user 104 becomes earlier, the economic advantage increases, but so does the probability of liability related to a payment made to a user 104 that is then not covered by a commission subsequently paid by the advertiser 120.

Examples of frequently occurring disruptions in the reward payment cycle include: when a user 104 fails to pick up a purchase designated for in-store pick-up within one week; when a purchase is discovered to be ineligible for cashback, where some advertisers 120 report purchases, then check eligibility days later; when a user's 104 payment method is declined (an advertiser 120 may report a purchase before charging the user 104, especially if the advertiser 120 reports purchases immediately but charges the user 104 once the order is shipped); and when various user-initiated transaction reversals occur. User-initiated transaction reversals are initiated somewhat frequently, generally occurring before the advertiser 120 pays for the commission. Common examples of user-initiated transaction reversals include: when a user 104 performs a credit card charge-back on the purchase; when a user 104 cancels, refunds, or modifies their order; and when a user 104 makes a fraudulent purchase, or makes a purchase using a stolen credit card. Each of these events disrupt the ordinary payment cycle, leading to advertisers 120 modifying or withholding completely commission payments to publishers 102 as a result. If a publisher 102 has already made a reward payment to a user 104 for the transaction subject to the disruption (user-initiated reversal or other occurrence), then the publisher 102 incurs a liability for that payment made as a result. Publishers 102 may incur significant liabilities if they continue to grant purchase reward payment or cashback payment requests from users 104 in advance of commission payments from advertisers 120 without adjusting for probabilities of repayment indicated by the data.

Figure 3:
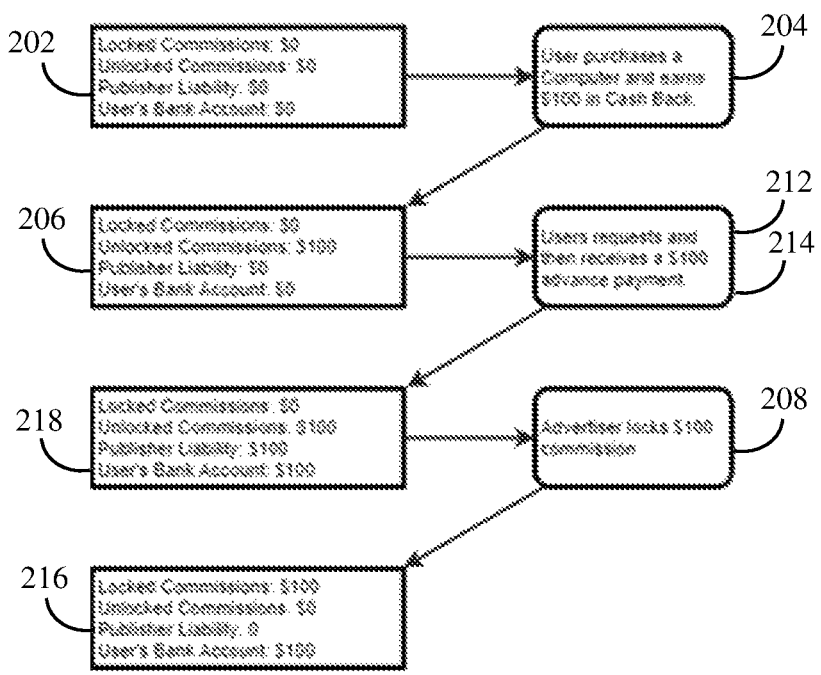
FIG. 3 is a diagrammatic flow chart illustrating an example computer implemented method showing the payment cycle improved in such a way that the user experiences an improved flow of accelerated payments, if the transaction is not reversed.

This payment cycle, however, may be improved by using technology advancements in accordance with the present invention that enable payment to be accelerated while mitigating risk and liability related to user 104 and advertiser 120 payments. Examples of this improvement are depicted using the computer implemented method 200 for diminishing latency in processing reward payments to users 104, illustrated in diagrammatic flow charts in FIGS. 3-5. FIG. 3 demonstrates how the payment cycle is improved using an example computer implemented method 200 for diminishing latency in processing reward payments to users 104, so a user 104 experiences the improved flow of accelerated payments in scenarios where no transaction is reversed. As most users 104 do not experience transaction reversals, this is the most common experience for users 104. This flow is similar to FIG. 2, with a difference being that the user 104 is able to request payment before the payment has locked. When the method begins the reward payment cycle at cycle at Step 202, the user 104 clicks a publisher 102 link. That publisher 102 redirects the user 104 to an affiliate network 118 (or to advertiser 120 content or resources), adding special tracking parameters to monitor and verify activity. The user 104 interacts with the advertiser 120 and makes a purchase (e.g. a computer) at Step 204, thereby earning a reward. The advertiser 120 reports that purchase to publisher 102 at Step 206, thereby establishing and verifying the existence of an unlocked commission to be paid to the publisher 102 in the future (e.g. system 100 records would indicate $0 in locked commissions; $100 now present in unlocked commissions; $0 in accrued publisher 102 liability; and $0 transferred to user's bank account 124). Under accelerated payment, a user 104 may request payment of a reward immediately in Step 212, and the publisher 102 pays the user 104 (including from the publisher account 126) at Step 214. In this instance, no payment of any commission has been made for the corresponding purchase, and so at Step 218 there is $0 in locked commissions; $100 in unlocked commissions; $100 in publisher 102 liability from the payment made at Step 214; and $100 transferred to user's bank account 124. Payment at Step 214 records data for the user bank account 124 registered to the user's 104 reward account that receives the payment transfer and the reward payment data is linked to that bank account data, to be used for any future reversals of matching payments or related transactions and transfers in the event that publisher 102 wishes to cancel all or part of any payment made at step 214, maintaining that data even if the user 104 subsequently modifies user account data, user profile data, etc. to reflect a different bank account. The advertiser 120 may send one or more purchase reports, which typically include the tracking parameters from prior steps, the expected commission, and the sale value, to indicate changes to the commission and sale value (e.g., due to transaction reversals). At Step 208, the advertiser 120 at some point then reports that sale is locked as a locked commission, most often upon expiration of the refund period. The advertiser 120 subsequently pays publisher 102 a commission due by a transaction with the publisher account 126 for locked sales at Step 216 (updating system 100 records to reflect $100 in locked commissions; $0 in unlocked commissions; $0 in publisher 102 liability because the payment from the advertiser 120 for the commission satisfied the outstanding accrued liability; and $100 transferred to user's bank account 124).

Figure 4:
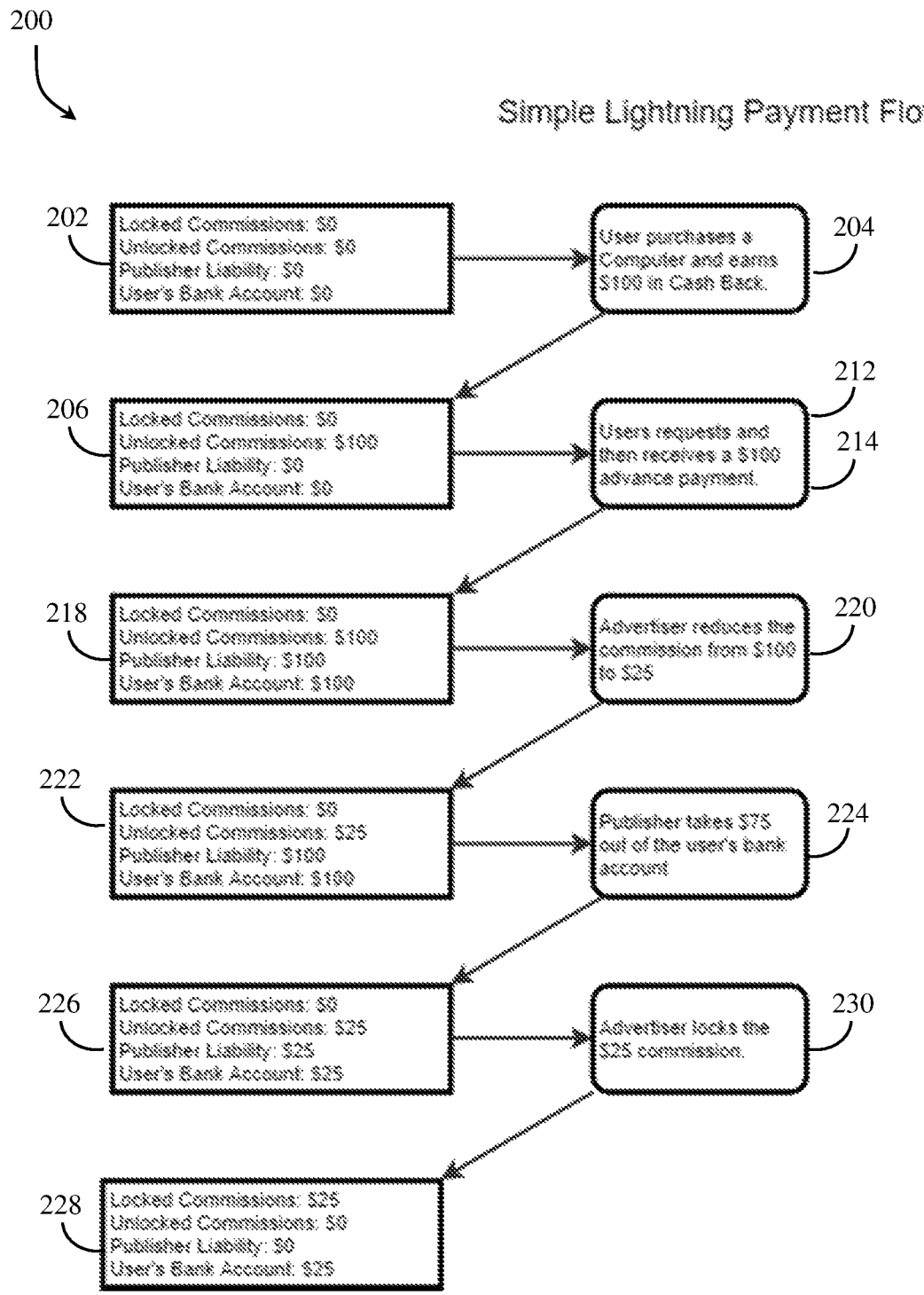
FIG. 4 is a diagrammatic flow chart illustrating an example computer implemented method describing the flow of accelerated payments if a user made a payment request, wherein the transaction is later partially reversed.

FIG. 4 depicts an example computer implemented method 200 for diminishing latency in processing reward payments to users demonstrating what happens when a user makes an accelerated payment request, but the transaction was later partially reversed. This example method begins with identical steps to FIG. 3, however after Step 218 records a liability, but before Step 208 when the advertiser 120 locks the commission, at Step 220 advertiser 120 reduces commission from $100 to $25 (for example to reflect a return of a portion of the purchase and consequential refund of a portion of the purchase price to the user 104). Note that the publisher 102 does not remove money from the user's bank account 124 until after the advertiser 120 notifies the publisher 102 that the transaction was partially refunded. At Step 222 the system 100 is notified of the reduction and updates records to indicate $0 in locked commissions; $25 in unlocked commissions after the reduction; $100 in publisher 102 liability; and $100 transferred to user's bank account 124. Then, at Step 224 the publisher 102 executes an automated clearing house transaction to correct the transaction with the user 104 and recover the unearned portion of the reward paid, pursuant to the agreement the member user 104 entered into allowing for such transactions, thereby reversing $75 out of user's bank account 124 and returning it to the system 100 and its accounts 126. Step 224 may debit the same user bank account 124 as was credited during step 214. In particular example embodiments the system 100 performs the related transfers by receiving, using processor 106, processing data, special tracking parameters, reports related to purchases, receipt data, link data, transaction records, purchase transaction notifications, initiative data, other notifications, commission data, or other related data that the advertiser 120 transmits to the system 100, parses that data, and retrieves relevant data stored in the one or more storage devices 114 comprising one or more databases or block chains, using strings, fields, records, pointing, hashing, memory addresses, data structures and functions related thereto to manage incoming data and data stored in the one or more storage devices 114. The system 100 compares stored data to incoming data and matches parsed data by user 104, tracking parameters, user account data, link data, purchase amounts, receipt data, the registered user profile data, device data or other uniquely identifying data. The processor 106 compiles and aggregates corresponding records and values, reconciling, using an adjustment device, differences between the one or more locked commissions, the commission data and the one or more reward payments, corresponding to the relevant user 104. Once these differences are computed, the processor 106 creates, using the appropriate user bank account 124 data, user account data, link data, the registered user profile data, retrieved from the one or more storage devices 114, one or more automated bidirectional transfer directives and transmits those transfer directives to the one or more third party financial entities responsible for the one or more user accounts adjusted by the transfer. The system 100 and processor 106 then update the processing data, registered user profile data, user account data and system intelligence data for future processing activities in the one or more storage devices 114. Following the reversal and recovery, at Step 226 the system 100 records reflect $0 in locked commissions; $25 in unlocked commissions; $25 in publisher 102 liability; and $25 transferred to user's bank account 124 after the $75 was reversed. Then at Step 230 the advertiser 120 locks the $25 commission and at Step 228 pays the $25 commission payment to the system 100, resulting $25 in locked commissions; $0 in unlocked commissions; $0 in publisher 102 liability; and $25 transferred to user's bank account 124.

Figure 5:
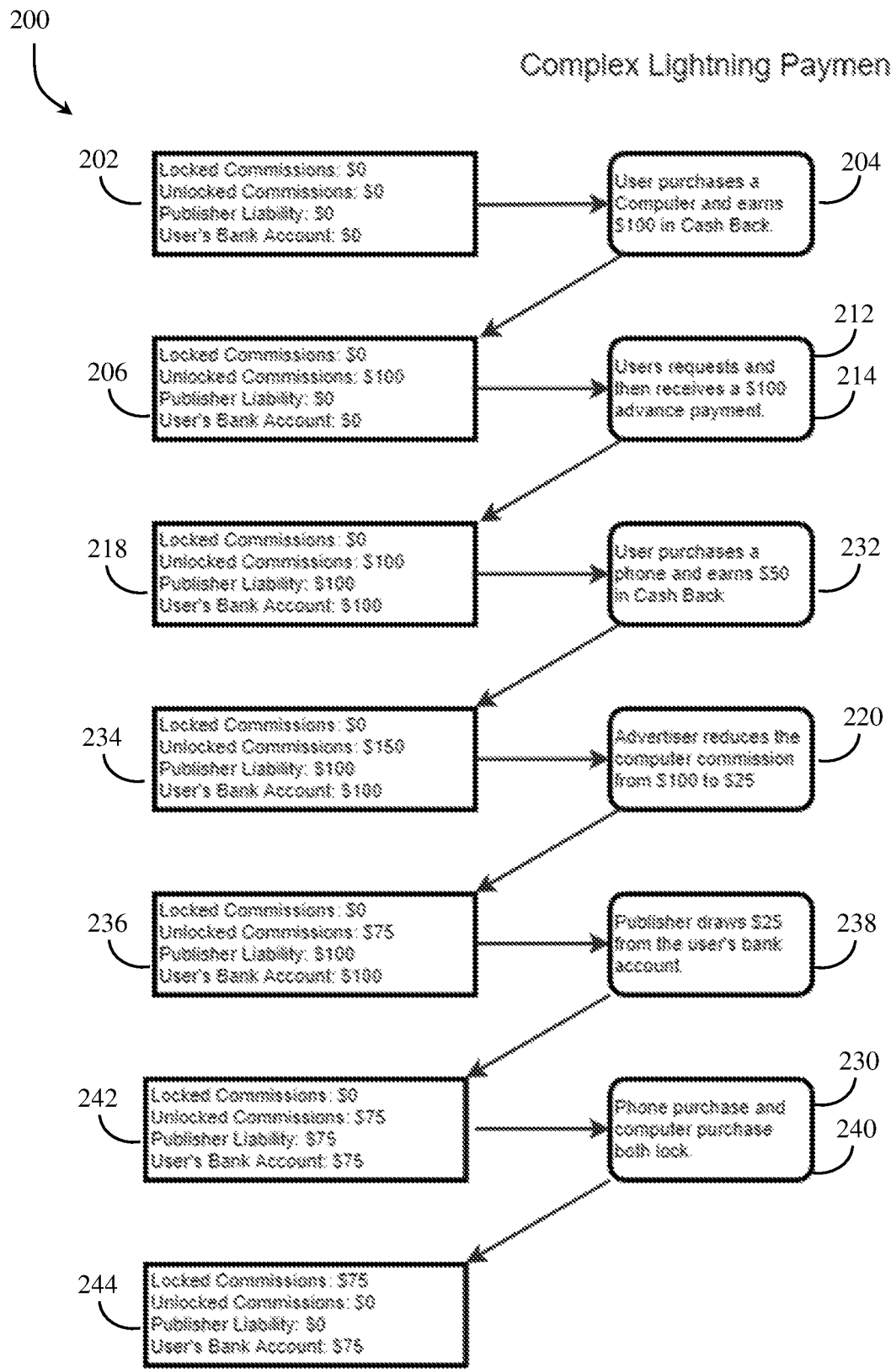
FIG. 5 is a diagrammatic flow chart illustrating an example computer implemented method that describes later purchases altering an accelerated payment from being fully reversed.

FIG. 5 depicts an example computer implemented method 200 for diminishing latency in processing reward payments to users 104 demonstrating how later purchases can prevent or alter an accelerated payment from being fully reversed (or reversed at all). This example method begins with identical steps to FIG. 3, however after Step 218 records a liability, but before Step 208 when the advertiser 120 locks the commission, at Step 232 the same member user 104 makes an additional purchase (e.g. of a phone) and earns $50 cash back. At Step 234 the system 100 now reflects that the relevant balances are $0 in locked commissions; $150 in unlocked commissions (e.g. for computer and phone purchases); $100 in publisher 102 liability; and $100 transferred to user's bank account 124 (reflecting only payment to the user 104 that was made for a computer but not for the phone). Then at Step 220 advertiser 120 reduces commission from $100 to $25 for the first purchase (e.g. computer). At Step 236 system 100 records now indicate $0 in locked commissions; $75 in unlocked commissions; $100 in publisher 102 liability; $100 transferred to user's bank account 124. Here publishers 102 can reduce the likelihood of needing to draw money from a user's bank account 124 by delaying recovery of funds, thus giving the user 104 more time to make purchases which offset the user's 104 liability. Even if a transaction has been reversed, a publisher 102 is likely to avoid drawing funds from a user's bank account 124 to compensate unless the user's 104 unlocked commissions fall below the publisher's 102 liability; the user's 104 unlocked commissions may lock without further modification, negating the need to draw from the user's bank account 124. Following this advancement, at Step 238 the publisher 102 executes an automated clearing house transaction using user 104 profile and account data stored by the system 100 (using the system 100 operations and functions detailed above) to correct the transaction with the user 104 and recover the unearned portion of the reward paid, pursuant to the agreement the member user 104 entered into allowing for such transactions, thereby reversing only $25 from the user's bank account 124 and returning it to the system 100 and its accounts 126, with $50 of additional cashback reward offsetting the prior shortfall due to reduction in commission. Following the reversal and recovery, at Step 242 the system 100 records indicate $0 in locked commissions; $75 in unlocked commissions; $75 in publisher 102 liability; $75 transferred to user's bank account 124 (reflecting the $25 removed by ACH transfer). After the expiration of the relevant refund periods, the advertiser 120 at Step 230 locks the computer commission and at Step 240 the advertiser 120 locks the $50 phone commission as well. Finally, at Step 244 the system 100 receives payment from the advertiser 120 for the two commissions resulting in system 100 balances being recorded for all relevant transactions as $75 in locked commissions; $0 in unlocked commissions; $0 in publisher 102 liability; $75 transferred to user's bank account 124. Whenever the advertiser 120 transmits data to the system 100, whether it be processing data, special tracking parameters, reports related to purchases, receipt data, link data, transaction records, purchase transaction notifications, initiative data, other notifications, commission data, or other related data, the system 100 receives and processes that data using the system processor 106. The processor 106 parses the incoming data and retrieves relevant data stored in the one or more storage devices 114 comprising one or more databases or block chains, using strings, fields, records, pointing, hashing, memory addresses, data structures and functions related thereto to manage incoming data and data stored in the one or more storage devices 114. The system 100 compares stored data to incoming data and matches parsed data by user 104, tracking parameters, user account data, link data, or other uniquely identifying data. The system 100 and processor 106 appropriately store the now associated data in the one or more storage devices 114, then the processor 106 performs required computations and updates the processing data, registered user profile data, user account data and system intelligence data for future processing activities in the one or more storage devices 114. Advertisers are not required to adjust any advertiser processing during implementation of the altered payment cycle because operations remain outside the scope of their interaction, and so an advertiser still reports all commissionable activity to the publisher with no consideration of how the publisher translates this activity into reward payments.

These alternative steps of FIG. 5 add flexibility to the system 100 that was not possible under conventional payment cycle, minimize the number of transactions that must be performed, and reduce user 104 impact. For purposes of depicting liability efficiently, FIGS. 3-5 assumed that the publisher 102 always pays exactly 100% of the received commission. In practice, a publisher 102 may pay less than 100% (earning a profit) or more than 100% (paying out of pocket), without departing from the scope of this invention, in order to promote various payment schemes. This does not change how users 104 are billed, and does not change the calculations, but makes the term "liability" variable. While this changes the magnitude of risk, it does not change the reasoning or underlying functions, because awarded cashback is a percentage of awarded cashback rewards, even it is not always equal to 100%.

In the system 100 and method 200, the mechanism (e.g., bank details) used to recover from liability must be stored until all liability is removed. If a user 104 requests this information be deleted (or requests that the user's reward account be closed), publisher 102 may choose to remove all liability by charging the user 104 for all liability, even if that liability is potentially covered by unlocked commissions.

In order to further minimize delay for reward payment while minimizing reward payment liability, the publisher 102 may use collected data from user 104 members and advertisers 120 to adjust parameters and rules according to data and intelligence derived about participants in the payment cycle. For example, in addition to ensuring a means of recovering lost funds by use of accounts 124 with automated clearing house transaction configuration, liability for accelerated reward payments can be reduced by the system 100 and method in further ways including: designating a maximum liability limit allowed per user 104, per month, per advertiser 120, per recovery account 124 (e.g., bank account) or combinations thereof; disallowing advance payments or accelerated payments for users 104 who share a user's bank account 124; disallowing advance payments or accelerated payments on merchants which have frequent reversals; disallowing advance payments or accelerated payments that have extended locking periods (e.g., travel); for merchants with frequent automated transaction reversals, preventing advance payments or accelerated payments from being offered until after the automated transaction reversal period has passed (this period is generally far shorter than the refund period); using additional industry standard fraud detection rules; if a transaction unexpectedly remains unlocked for an extended period of time, not treating it as being able to cover for current liability; graduating or adjusting initial reward values; and performing two factor identification with user device 122 to minimize fraudulent interactions.

The technological solution presented by the invention modifies the conventional payment cycle with improved payment components that enable automated clearing house (ACH) transfers to and from system 100 managed user bank accounts 124, thereby providing several advancements that the conventional payment cycle is incapable of providing. Using automated clearing house (ACH) transfers directly into the appropriate registered user bank account 124 correlated by system 100 collected data to a particular purchase transaction minimizes delay for reward payment to the user 104 while simultaneously minimizing reward payment liability accrued by the publisher 102 because the publisher is enabled to use the automated clearing house (ACH) transfer to reverse a payment, thereby limiting any loss to the publisher 102 that could result from a subsequent advertiser 120 modification to a commission for the related purchase. The publisher 102 may operate reward payment to users 104 independent of any advertiser 120 refund period or delay without increasing risk or liability. Moreover, the capability to analyze and manage both user 104 and advertiser 120 data related to purchases and reward payments is used in conjunction with the capability to quickly and efficiently both make and reverse reward payments for purchases to the proper user bank account 124 to provide publishers 102 with the ability to more accurately, efficiently, and flexibly monitor and manage publisher 102 reward payment schemes and related financial resources. Particularly, the system 100 and method 200 enable a publisher 102 to aggregate multiple commissions and reward payment requests in a manner that enables the publisher 102 to reduce or offset payment and reversal ACH transactions, reducing the number of transactions a publisher 102 must perform, reducing the number of instances where additional review or manual review is required, reducing the load on computing resources enabling those resources to perform more quickly, and frequently reducing the number and amount of transaction reversals performed on user bank accounts 124, improving clarity and efficiency for users 104, resulting in a better performing system 100 and payment cycle. The system 100 and method 200 enable analysis and management of both user 104 and advertiser 120 data that may be implemented using a variety of payment models. In example embodiments, as an alternative to ACH transactions a user 104 may designate a credit card or other payment card, and/or account related thereto, to perform similar payment and reversal transactions or transfers. In example alternative embodiments, a user 104 may also designate more than one account, or more than one type of account, to be used by the system 100 and method 200 as the user bank accounts 124 for performing transactions and transfers. In example alternative embodiments, a user 104 may also choose to receive reward payments, advance payments or accelerated payments associated with particular purchases facilitated by the publisher 102 using a delivery device supplemental to user bank accounts 124 comprising gift cards, reward cards, checks, prizes, digital or cryptographic currency, or customized publisher currency such as "befrugalbucks," wherein the system 100 and method 200 are still able to manage user account data and perform payment and reversal transactions or transfers as computed by the system 100 and processor 106.

Figure 6:
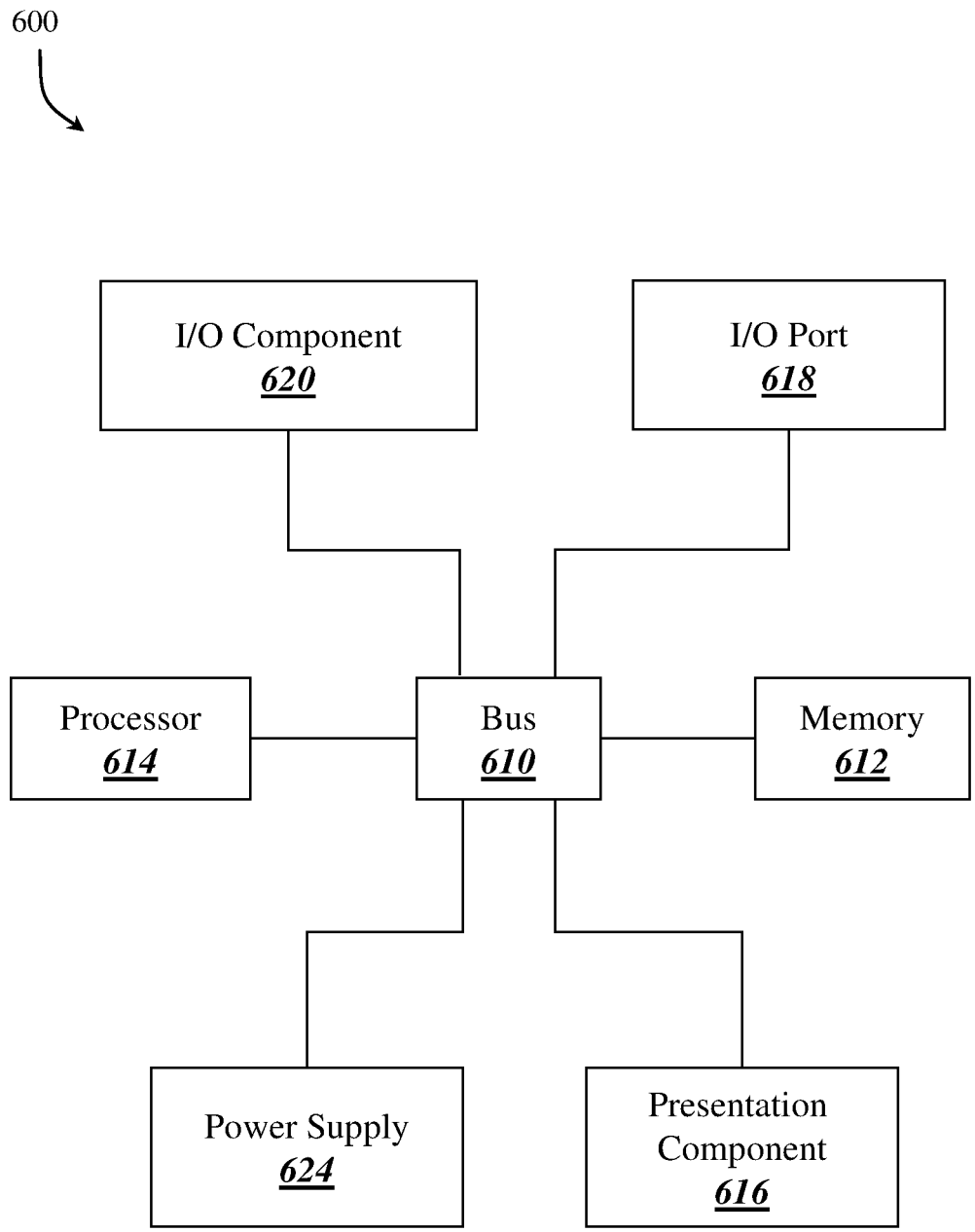
FIG. 6 is a diagrammatic illustration of a high-level architecture for implementing systems and processes in accordance with aspects of the invention.

Any suitable computing device 600 can be used to implement the computing/user devices 122, or the publisher system 100, and methods/functionality described herein and be converted to a specific system 100 for performing the operations and features described herein through modification of hardware, software, and firmware, in a manner significantly more than mere execution of software on a generic computing device 600, as would be appreciated by those of skill in the art. One illustrative example of such a computing device 600 is depicted in FIG. 6 is a diagrammatic illustration of a high-level architecture for implementing systems and processes in accordance with aspects of the invention. The computing device 600 is merely an illustrative example of a suitable computing environment and in no way limits the scope of the present invention. A "computing device," as represented by FIG. 6, can include a "workstation," a "server," a "laptop," a "desktop," a "hand-held device," a "mobile device," a "tablet computer," or other computing devices 600, as would be understood by those of skill in the art. Given that the computing device 600 is depicted for illustrative purposes, embodiments of the present invention may utilize any number of computing devices 600 in any number of different ways to implement a single embodiment of the present invention. Accordingly, embodiments of the present invention are not limited to a single computing device 600, as would be appreciated by one with skill in the art, nor are they limited to a single type of implementation or configuration of the example computing device 600.

The computing device 600 can include a bus 610 that can be coupled to one or more of the following illustrative components, directly or indirectly: a memory 612, one or more processors 614, 106, one or more presentation components 616, input/output ports 618, input/output components 620, and a power supply 624. One of skill in the art will appreciate that the bus 610 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 6 is merely illustrative of an exemplary computing device 122, 600 that can be used to implement one or more embodiments of the present invention, and in no way limits the invention.

The computing device 600 can include or interact with a variety of computer-readable media. For example, computer-readable media can include Random Access Memory 108 (RAM); Read Only Memory 108 (ROM); Electronically Erasable Programmable Read Only Memory 108 (EEPROM); flash memory 108 or other memory 108 technologies; CDROM, digital versatile disks (DVD) or other optical or holographic media; magnetic cassettes, magnetic tape, magnetic disk storage (storage devices 114) or other magnetic storage devices that can be used to encode information and can be accessed by the computing device 600.

The memory 612 can include computer-storage media in the form of volatile and/or nonvolatile memory 108. The memory 612 may be removable, non-removable, or any combination thereof. Exemplary hardware devices are devices such as hard drives, solid-state memory 108, optical-disc drives, and the like. The computing device 600 can include one or more processors 106 that read data from components such as the memory 612, the various I/O components 616, etc. Presentation component(s) 616 present data indications to a user device 122 or other device. Exemplary presentation components include a display device, speaker, printing component, vibrating component, etc.

The I/O ports 618 can enable the computing device 600 to be logically coupled to other devices, such as I/O components 620. Some of the I/O components 620 can be built into the computing device 600. Examples of such I/O components 620 include a microphone, joystick, recording device, game pad, satellite dish, scanner, printer, wireless device, networking device, and the like.

To any extent utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A computer implemented method for diminishing latency in processing reward payments to users, comprising:
    receiving, using a processor of a publisher system and an electronic network, processing data from one or more computer devices of at least one advertiser corresponding to an initiative of the at least one advertiser comprising commission data, and storing, using a storage device and the processor of the publisher system, the processing data;
    receiving, from a user device, activity identifier data of a purchase made with the at least one advertiser corresponding to the initiative and a request for payment of a reward payment for the purchase;
    confirming, using the processor of the publisher system, that the user device and one or more user accounts correspond to a registered user, and that the purchase corresponds to the advertiser initiative and the processing data;
    paying, using the processor, the reward payment by one or more automated bidirectional transfers to the one or more user accounts according to the processing data and prior to at least one of the group consisting of locking a commission of the at least one advertiser, expiration of a refund period, payment of a commission by the at least one advertiser to the publisher system, payment of a commission by the at least one advertiser to an affiliate network, and combinations thereof;
    receiving, from the at least one advertiser, one or more locked commissions of the at least one advertiser, and reconciling, using an adjustment device, differences between the one or more locked commissions, the commission data and the reward payment; and
    adjusting the one or more user accounts by one or more adjustment automated bidirectional transfers when one or more locked commissions of the at least one advertiser and the reward payment are not equivalent, then updating the processing data, registered user profile data and system intelligence data for future processing activities;
    wherein, by using automated bi-directional transfers, reward payments are made without the delay of having to wait for at least one of the group consisting of locking a commission of the at least one advertiser, expiration of a refund period, payment of a commission by the at least one advertiser to the publisher system, payment of a commission by the at least one advertiser to an affiliate network, and combinations thereof, as the automated bi-directional transfers enable adjustments to the one or more user accounts after the commission has been locked.

2. The computer implemented method of claim 1, wherein the registered user comprises a user that has consented and registered by providing financial data designated for the publisher system to make automated bidirectional transfers and adjustment automated bidirectional transfers comprising debit and credit transfers to and from the one or more user accounts held with a third party financial entity, the registered user profile data, and device data corresponding to the user device.

3. The computer implemented method of claim 1, wherein the activity identifier data comprises link data or receipt data, the one or more automated bidirectional transfers comprise one or more automated clearing house (ACH) transfers, and the one or more adjustment automated bidirectional transfers comprise one or more adjustment automated clearing house (ACH) transfers.

4. The computer implemented method of claim 1, wherein adjusting the one or more user accounts by one or more adjustment automated bidirectional transfers comprises reversing funds paid to the one or more user accounts using an additional ACH transfer back to an account of the publisher system in an amount comprising the differences between the one or more locked commissions and the reward payment for the purchase already paid to the one or more user accounts.

5. The computer implemented method of claim 4, wherein reversing the funds paid to the one or more user accounts using the additional ACH transfer comprises reversing all of the funds paid to the one or more user accounts or reversing only part of the funds paid to the one or more user accounts.

6. The computer implemented method of claim 1, wherein adjusting the one or more user accounts by one or more adjustment automated bidirectional transfers comprises altering an amount comprising the differences between the one or more locked commissions and the reward payment for the purchase already paid to the one or more user accounts by an amount of pending unpaid reward payments for other purchases made by the user.

7. The computer implemented method of claim 6, wherein adjusting the one or more user accounts by one or more adjustment automated bidirectional transfers comprises decreasing an amount for reversing funds paid to the user corresponding to amounts of pending unpaid reward payments for other purchases made by the user and subsequently adjusting pending unpaid reward payments to account for satisfaction of a reversal balance.

8. The computer implemented method of claim 1, wherein the differences between the one or more locked commissions, the commission data and the reward payment comprise one or more of the group consisting of:
    failure, by the user, to pick up within one week the purchase wherein the purchase was designated for in-store pick-up;
    the purchase being ineligible for reward payment;
    a payment method of the user being declined;
    the user initiates transaction reversal;
    the user performs credit card charge-back on the purchase;
    the user cancels the purchase;
    the user modifies the purchase or an order related thereto;
    the purchase being refunded;
    the user makes the purchase fraudulently;
    the user makes the purchase using a stolen credit card; and
    combinations thereof.

9. The computer implemented method of claim 1, wherein the purchase is facilitated by the user activating a publisher link adding special tracking parameters to track user transaction activities and the processing data further comprises one or more transaction records of the advertiser.

10. The computer implemented method of claim 9, wherein the processing data further comprises one or more additional transaction records of the advertiser comprising a report from the advertiser of the purchase comprising the special tracking parameters.

11. The computer implemented method of claim 10, wherein receiving, from one or more computer devices of the at least one advertiser, further comprises the affiliate network, comprising at least one affiliate network, acting as an intermediary transferring data between the at least one advertiser and the publisher system.

12. The computer implemented method of claim 11, wherein the purchase is facilitated by the user activating a publisher link and the publisher system redirecting the user to an affiliate network, adding the special tracking parameters to track user transaction activities.

13. The computer implemented method of claim 12, wherein the processing data further comprises one or more additional reports from the advertiser of the purchase comprising at least one of the group consisting of an indication of changes to a value of the purchase, an indication of changes to the commission data; an indication of changes to a value of a commission, an indication that the purchase is locked so that values will not be modified, an indication that a commission is a locked commission, an indication of payment of the locked commission, and combinations thereof.

14. The computer implemented method of claim 1, wherein the publisher system comprises a publisher website configured to enable the user to request reward redemption, follow links to advertiser content, register for services provided by the publisher system, and provide user account data associated with the one or more user accounts wherein the user agrees to terms for ACH debit and credit transfers using the one or more user accounts and the user account data further comprises one or more of the group consisting of a user account number, a user account routing number, a user account type, a user account location, a user account financial entity, user account rules, user account restrictions, a user account unique identifier, user account access information, and combinations thereof.

15. The computer implemented method of claim 1, wherein the publisher system is configured to enable the user to request reward redemption, follow links to advertiser content, register for services provided by the publisher system, and provide user account data associated with the one or more user accounts wherein the user agrees to terms for the one or more automated bidirectional transfers using the one or more user accounts, wherein the one or more user accounts further comprise a first user account comprising a user credit card account or a user bank account providing for ACH debit and credit transfers and a second user account comprising a user credit card account or a user bank account providing for ACH debit and credit transfers used for adjusting the one or more user accounts when the one or more locked commissions of the at least one advertiser and the reward payment are not equivalent, then updating the processing data, registered user profile data and system intelligence data.

16. The computer implemented method of claim 1, wherein the publisher system is configured to enable the user to provide user account data associated with the one or more user accounts used to receive reward payments that selects a delivery device comprising one or more of the group consisting of gift cards, reward cards, checks, prizes, digital or cryptographic currency, and customized publisher currency, wherein paying, using the processor, the reward payment by one or more automated bidirectional transfers to the one or more user accounts further comprises initiating an alternative payment delivery to the user using the delivery device.

17. A system for diminishing latency in processing reward payments to users, the system comprising:
    at least one processor, memory, and at least one storage device;
    at least one advertiser device of at least one advertiser configured to analyze and transmit processing data corresponding to an initiative of the at least one advertiser comprising commission data;
    a user device, configured to provide to the processor activity identifier data of a purchase made with the at least one advertiser corresponding to the initiative and a request for payment of a reward payment for the purchase;
    a publisher website and an electronic communications network configured for communication among the system, the at least one advertiser device, and the user device;
    wherein the processor is configured to:
    receive and store, using the memory and the at least one storage device, the processing data transmitted by the at least one advertiser device,
    confirm that the user device and one or more user accounts correspond to a registered user, and that the purchase corresponds to the advertiser initiative and the processing data,
    receive, from the at least one advertiser, one or more locked commissions of the at least one advertiser;
    a payment processor, configured to pay a reward payment made by one or more automated bidirectional transfers to a user account according to the processing data and prior to at least one of the group consisting of locking a commission of the at least one advertiser, expiration of a refund period, payment of a commission by the at least one advertiser to the publisher system, payment of a commission by the at least one advertiser to an affiliate network, and combinations thereof;

an adjustment device configured to reconcile differences between the one or more locked commissions, the commission data and the reward payment; and adjust the one or more user accounts by one or more adjustment automated bidirectional transfers when one or more locked commissions of the at least one advertiser and the reward payment are not equivalent; and an update device, configured to update the processing data, registered user profile data and system intelligence data for future processing activities;

wherein, by using automated bi-directional transfers, reward payments are made without the delay of having to wait for at least one of the group consisting of locking a commission of the at least one advertiser, expiration of a refund period, payment of a commission by the at least one advertiser to the publisher system, payment of a commission by the at least one advertiser to an affiliate network, and combinations thereof, as the automated bi-directional transfers enable adjustments to the one or more user accounts after the commission has been locked.

18. The system of claim 17, wherein the registered user comprises a user that has consented and registered by providing financial data designated for the system to make automated bidirectional transfers and adjustment automated bidirectional transfers comprising debit and credit transfers to and from the one or more user accounts held with a third party financial entity, the registered user profile data, and device data corresponding to the user device.

19. The system of claim 17, wherein the activity identifier data comprise link data or receipt data, the one or more automated bidirectional transfers comprise one or more automated clearing house (ACH) transfers, and the one or more adjustment automated bidirectional transfers comprise one or more adjustment automated clearing house (ACH) transfers.

20. The system of claim 17, wherein adjusting the one or more user accounts by the one or more adjustment automated bidirectional transfers comprises reversing all of the funds paid to the one or more user accounts or reversing only part of the funds paid to the one or more user accounts using an additional ACH transfer back to an account of the publisher system in an amount comprising the differences between the one or more locked commissions and the reward payment for the purchase already paid to the one or more user accounts, and wherein adjusting the one or more user accounts by the one or more adjustment automated bidirectional transfers further comprises altering an amount comprising the differences between the one or more locked commissions and the reward payment for the purchase already paid to the one or more user accounts by an amount of pending unpaid reward payments for other purchases made by the user and subsequently adjusting the other pending reward payments to account for satisfaction of a reversal balance.

21. The system of claim 17, wherein the purchase is facilitated by the user activating a publisher link and the system redirecting the user to an affiliate network, adding special tracking parameters to track user transaction activities, and wherein the processing data further comprises one or more additional transaction records of the advertiser comprising a report from the advertiser of the purchase comprising the special tracking parameters.

22. The system of claim 17, wherein the system intelligence data limits maximum liability by implementing transaction safeguards selected from one or more of the group consisting of:
- limiting a number of transactions per user, per month, per advertiser, and per account;
- disallowing advance reward payments for users sharing a user account;
- disallowing advance reward payments corresponding to any advertiser with frequent reversals or differences in locked commissions;
- disallowing advance reward payments corresponding to any advertiser with extended locking periods;
- delaying reward payments until after an automated transaction reversal period has passed for advertisers with frequent automated transaction reversals;
- enabling additional industry standard fraud detection rules and logic;
- altering treatment of recovery liability and system intelligence data if a transaction unexpectedly remains unlocked for an extended period of time; and combinations thereof.

* * * * *